Dec. 20, 1966    R. B. CONN    3,292,425

DYNAMIC WHEEL TEST APPARATUS

Filed Sept. 30, 1963

United States Patent Office 3,292,425
Patented Dec. 20, 1966

3,292,425
DYNAMIC WHEEL TEST APPARATUS
Robert B. Conn, London, England, assignor to Pametrada, Wallsend, England, a British company
Filed Sept. 30, 1963, Ser. No. 312,747
Claims priority, application Great Britain, Oct. 4, 1962, 37,618/62
6 Claims. (Cl. 73—67)

This invention relates to a method of and apparatus for testing wheels, particularly though not exclusively turbine wheels.

It has already been proposed to produce flexural waves at a predetermined peripheral velocity of propagation in a turbine wheel by rotating the wheel under test at any one of a continuous range of speeds and by providing an electromagnet by means of which rhythmic pulling impulses are applied to a restricted peripheral annular zone of the wheel, choosing the speed of rotation and the frequency of the impulses so that a build up of wave amplitude in the wheel is produced.

However, in view of the large powers involved in rotating a bladed turbine wheel in an imperfect vacuum, it is very difficult to regulate the speed of rotation of the turbine wheel with the necessary accuracy to match a comparatively steady excitation frequency.

An object of the present invention is to avoid this difficulty and accordingly one aspect of the present invention comprises a method of testing a wheel by causing flexural waves to be produced therein of predetermined peripheral velocity of propagation, wherein the wheel is rotated at a selected speed and electrical impulses from, or instigated by, an impulse generator driven at a speed proportional to the speed of the wheel, are mixed in a multiplicative mixing device with impulses from a stable oscillator, and a component of the output voltage is applied by way of a power amplifier to an electromagnetic device serving to apply rhythmic forces to an annular part of the wheel. Preferably the impulse generator is driven in unison with the wheel.

Accordingly, the invention consists in an apparatus for testing a wheel comprising a shaft for carrying the wheel, prime mover driving means for rotating the shaft, means for selecting the speed of the shaft, impulse generating means actuated in proportion to the speed of the wheel, means for selecting an integral number of impulses per revolution of the shaft, an electromagnetic device for applying rhythmic forces to an annular part of the wheel, a stable oscillator, a multiplicative mixing device adapted to mix impulses from said impulse generator and from said oscillator, means for actuating the electromagnetic device in accordance with the output voltage of the mixing device. The impulse generator may be a toothed wheel of ferromagnetic material arranged to rotate in the field of a magnetic pickup or it may be an electro-optical device, e.g., the combination of a disc on which are formed black annuli, the border of which rises and falls so as to describe a sinusoidal variation of the dark and light areas cooperating with a light source and photocell; conveniently the mixing device may utilize the Hall effect in a semi-conductor.

The invention will now be particularly described by way of example with reference to the accompanying drawings in which.

Figure 1:
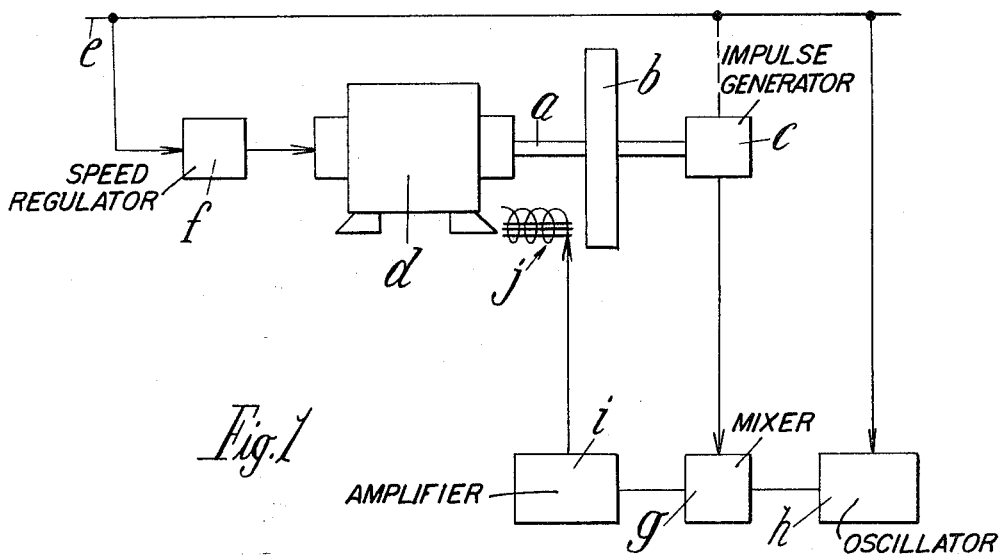
FIGURE 1 shows an apparatus constructed in accordance with the invention.

In carrying the invention into effect according to the example shown in FIGURE 1, a spindle $a$ on which a turbine wheel $b$ under test is mounted rigidly carries the impulse generator $c$ which will produce an exactly integral number of electrical impulses per revolution of the spindle $a$, so that the frequency of the impulses is proportional to the rotary speed of the wheel $b$. This number is capable of selection by an operator.

The spindle $a$ is driven by an electric motor $d$ connected to an electricity supply $e$ by way of a speed regulator $f$ so that the wheel $b$ may be rotated at a selected speed.

The impulses from the generator $c$ are supplied to a multiplicative mixing device $g$ to which is also supplied the output impulses from an adjustable stable audio frequency oscillator $h$. The output of the mixing device $g$, i.e., an alternating voltage comprising components the frequency of which is either the sum or the difference of the frequencies of the ingoing signals, is then applied by way of a power amplifier $i$ to an electromagnet device $j$ serving to apply rhythmic forces to an annular part of the turbine wheel $b$ under test.

According to whether the sum or the difference frequency coincides with the wave crest passage frequency it is either the forward or the backward running wave which will be built up by resonance. If the rotational speed of the spindle $a$ fluctuates, the frequency of the mixer output voltage will fluctuate by the product of the chosen integral number with the variation in turning speed.

The impulse generator $c$ may be a magnetic device, for example, comprising a toothed wheel, e.g., a multi-lobed cam, of ferromagnetic material turning in the constant magnetic field of a magnetic pickup to give sharply defined impulses, one impulse per tooth or lobe. Alternatively, there might be several groups of closely pitched fine teeth, which on passing the transducer produce carrier waves which, after rectification, could take the place of the impulses.

Alternatively, the impulse generator $c$ may be an electro-optical device, for example a disc on which are formed black annuli, the borders of which rise and fall so as to describe for example, a sinusoidal variation of the dark and light areas cooperating with a light source and photocell. Alternatively the annuli may be of constant width but having a transparency variable along the circumference of the annuli, this variation in transparency may for example be sinusoidal. In either case the photo-cell consequently produces an exactly integral number of electrical impulses per revolution of the spindle $a$, which number is proportional to the speed of rotation of the spindle $a$. These impulses are supplied to the mixing device $g$ which, preferably, utilizes the Hall effect in a semi-conductor, the audio frequency oscillator $h$ preferably being connected to the magnetic field coil so that the input impulses from the generator $c$ are supplied to one of the electrode pairs connected to the semi-conductor of the Hall effect mixing device and the resulting output voltage is produced at the other pair of electrodes. This output current is subsequently amplified by a power amplifier $i$ before being applied to the electromagnetic device $j$.

Figure 2:
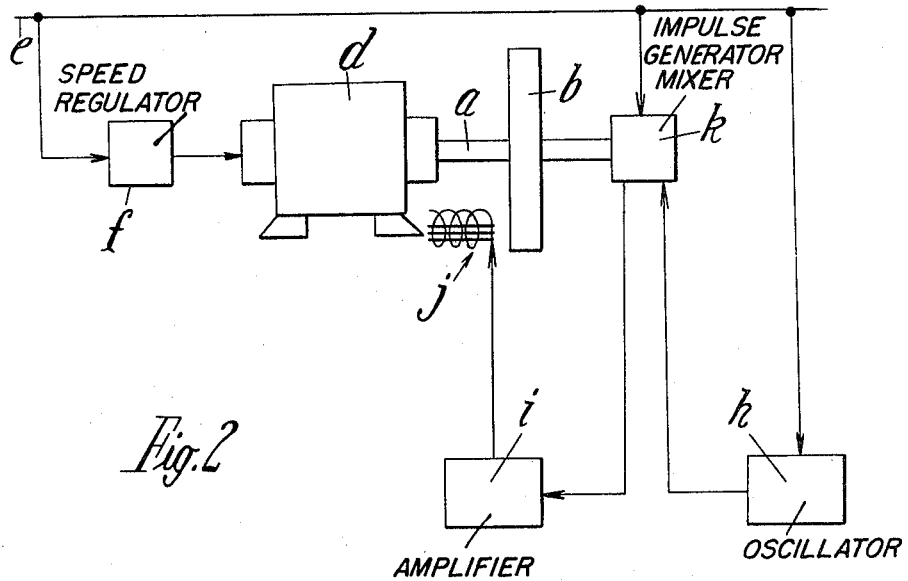
FIGURE 2 shows a modification of the apparatus shown in FIGURE 1.

In FIGURE 2 the mixing device of the stable oscillations from the oscillator $h$ is integral in a component $k$ with the impulse generator on the spindle $a$. In the case of using a magnetic device in the impulse generator the stable oscillations from the oscillator $h$ may be used to modulate the magnetic field of an electromagnet provided in the magnetic pick-up so that the resulting impulses from the component $k$ are mixed product of the impulses generated by the toothed wheel of ferromagnetic material and the stable oscillations from the oscillator $h$.

Alternatively, in the case of using an electro-optical device as the impulse generator as described above, the intensity of the light flux produced by the light source or alternatively the driving voltage of the photo-cell may be modulated by the stable oscillations of the oscillator $h$. In the first case a gas discharge lamp may be the light source having an instantaneous current passing through it and this instantaneous current activating the light source may be modulated by the stable oscillations from the oscillator $h$. In the second case the oscillations from the oscillator $h$ may be used to modulate the driving voltage of the photo-cell.

Since, however, most mixing devices tend to produce not only the desired sum and difference frequencies, but also other frequencies, it is usually desirable to purify the output signal by passing it through a tunable filter, e.g., a wave analyser.

A manner of operation of this test plant is to determine first with the wheel at rest the resonant frequencies of the wheel and the coordinated mode of vibration, i.e., the integer number of waves which exactly fit into the circumference at resonance. Next the wheel is rotated at a number of selected velocities each of which are kept as steady as the speed control device will permit, and the multiple selector of the impulse generator is successively set to multiplication factors of 2, 3, 4 . . . $n$ (usually $n$ does not exceed 10). The frequency of the stable oscillator is next adjusted so that a resonance is built up and the frequency is determined. This frequency, as a rule, will be somewhat higher than the frequency which was found with the wheel at rest for a mode corresponding to the multiplication factor of the impulse generator.

From the difference of the resonant frequencies at rest and at speed the effective stiffening effect of centrifugal forces can be determined.

Alternatively, the stable oscillator and the multiple selector are preset and the speed of rotation is varied until resonance is observed when the instantaneous speed of rotation is measured.

I claim:

1. An apparatus for testing a wheel comprising a shaft adapted to carry the wheel, prime mover driving means adapted to rotate the shaft and wheel, means for selecting the speed of the shaft, impulse generator means driven in proportion to the speed of the wheel, means for selecting an integral number of impulses per revolution of the shaft, a stable oscillator, multiplicative mixing means having inputs from the impulse generator and from the stable oscillator and producing an output having frequency components equal to the sum of the input frequencies and the difference of the input frequencies, a power amplifier, an electromagnetic device located adjacent the wheel, means connecting a component of the output of the mixing means to the electromagnetic device via the amplifier to apply rhythmic forces to an annular part of the wheel.

2. An apparatus as claimed in claim 1 wherein the impulse generator is driven in unison with the wheel.

3. An apparatus as claimed in claim 1 wherein the impulse generator is a toothed wheel of ferro-magnetic material arranged to rotate in the field of a magnetic pick-up.

4. An apparatus as claimed in claim 1 wherein the impulse generator is an electro-optical device.

5. An apparatus as claimed in claim 1 wherein the mixing device utilizes the Hall effect.

6. An apparatus as claimed in claim 1, wherein the mixing means is integral with the impulse generator means.

References Cited by the Examiner

UNITED STATES PATENTS

| 1,502,903 | 7/1924 | Campbell | 73—67.2 X |
| 2,404,965 | 7/1946 | Kilgore et al. | 73—71.5 |

JAMES J. GILL, *Acting Primary Examiner.*